United States Patent
Cotton, Jr.

(10) Patent No.: US 6,199,999 B1
(45) Date of Patent: Mar. 13, 2001

(54) LIGHTING SYSTEM FOR THEATER SEATING

(75) Inventor: John Leonard Cotton, Jr., Dallas, TX (US)

(73) Assignee: The Science Place, Dallas, TX (US)

( * ) Notice: Subject to any disclaimer, the term of this patent is extended or adjusted under 35 U.S.C. 154(b) by 0 days.

(21) Appl. No.: 09/203,056

(22) Filed: Dec. 1, 1998

(51) Int. Cl.[7] ............................. F21V 33/00; A47B 23/06
(52) U.S. Cl. .................... 362/131; 362/127; 362/234; 297/445.1; 297/217.6
(58) Field of Search .................... 362/131, 127, 362/234, 253, 249, 230, 231, 147; 434/286; 297/445.1, 217.6

(56) References Cited

U.S. PATENT DOCUMENTS

| | | | |
|---|---|---|---|
| 1,420,059 | * 6/1922 | Roth | 297/217.6 |
| 2,192,577 | * 3/1940 | Jungerman | 297/332 |
| 2,257,496 | * 9/1941 | Gaugler et al. | 340/667 |
| 2,635,681 | * 4/1953 | Hiltman et al. | 297/217.6 |
| 4,217,628 | * 8/1980 | Windom | 362/483 |
| 4,394,714 | 7/1983 | Rote | 362/576 |
| 5,311,411 | 5/1994 | Garolfi | 362/493 |

FOREIGN PATENT DOCUMENTS 2579297 9/1986 (FR) .

* cited by examiner

*Primary Examiner*—Alan Cariaso
*Assistant Examiner*—Ronald E. Delgizzi
(74) *Attorney, Agent, or Firm*—Randall C. Brown; Priscilla L. Ferguson; Akin, Gump, Strauss, Hauer & Feld, L.L.P.

(57) ABSTRACT

A lighting system for use in areas of low-level lighting, such as a planetarium, theater, museum, or auditorium, which improves visibility of objects without detracting from the overall desired low-level lighting. The lighting system provides a safe and low cost way to illuminate certain areas of a darkened room while maintaining an overall dimly lit environment.

10 Claims, 4 Drawing Sheets

LIGHTING SYSTEM FOR THEATER SEATING

FIELD OF THE INVENTION

The present invention relates to a lighting system for use in areas of low-level lighting which improves visibility of objects held adjacent to a light source of the lighting system, without detracting from an overall desired low-level lighting.

BACKGROUND OF THE INVENTION

Lighting systems designed to improve safety in theaters, planetariums, aircraft and auditoriums are known. In particular, lighting systems which illuminate walkways, stairs and handrails are known in the art. One area which has not been improved is lighting which enhances visibility of objects while maintaining an intended overall low-level lighting environment and minimizing the direct projection of light into a person's eyes.

Some theaters and auditoriums employ overhead lighting to provide sufficient illumination of objects such as playbills. Such lighting systems suffer disadvantages. First, overhead lighting scatters within the theater or auditorium, thereby increasing ambient light levels and interfering with a person's ability to view a movie or show. Second, even if scattering is minimized by limiting the size and quantity of overhead lighting, a human viewer must hold an object such as a playbill up to the light to be able to see the object. Looking up at the light prevents a viewer's eyes from adjusting to the ambient low-level lighting, thus preventing the viewer from fully enjoying the movie or show.

Lighting systems used in exhibits of nocturnal creatures in museums are also generally only used as safety aids to improve the visibility and illumination of walkways therein.

Instrument panels of aircraft flown at night are known to be equipped with post-lights that emit red light downwardly toward the instrument panel but not upwardly directly toward the eyes of a pilot.

Thus, there remains a need for a low-level lighting system for theaters, planetariums and auditoriums that permits a person to read a playbill, star chart or other written material while maintaining the low-level lighting environment.

SUMMARY OF THE INVENTION

The system of the present invention overcomes the above-mentioned disadvantages and deficiencies which are characteristic of the prior art. The system of the present invention also has the further advantages of being relatively simple and economical to prepare. The system of the present invention has still further advantages of enhancing educational or enjoyment aspects of a performance or similar display.

The present invention employs a light source, for example, a light-emitting diode, disposed in a room such that it will illuminate only a desired small area of an otherwise darkened room. The lighting system of the present invention not only maintains a desired low level of ambient lighting, it also allows the eyes of a person using the lighting system to remain adapted to darkness, even when viewing objects with the lighting system. The present lighting system permits a person to see distant objects in a low-level ambient-lighting area and hand held objects held by the person.

Thus, one aspect of the invention provides a lighting system for use in a theater, auditorium, museum or planetarium having a low level of ambient light. In a preferred embodiment, the lighting system of the present invention includes a first seating structure having a back disposed along a plane which is substantially vertical and preferably disposed at an angle of 30 to 120 degrees and most preferably disposed at an angle or 60 to 90 degrees relative to a first supporting surface disposed beneath said seating structure, a support affixed to the back of the first seating structure, at least one light source, and a cover extending from the back of the first seating structure for blocking a major portion of light emitted from the light source in an upward direction, such that the emitted light does not project directly into the eyes of a person adjacent the lighting system. The lighting system does not significantly increase the level of ambient light in a theater, auditorium, museum or planetarium.

Preferably, the first seating structure is a bench, chair, seat, pew, bleacher or other similar structure generally used for the provision of seating.

Preferably, the light source emits any visible light. More preferably the light source emits red or green light and most preferably the light source emits green light.

Preferably, the lighting system permits a user's eyes to remain dark adapted in areas with low-evel ambient lighting.

The lighting system preferably includes more than one light source.

In another preferred embodiment, the present invention provides an image projection system for use in an auditorium, planetarium, museum or theater having low-level ambient lighting. The projection system includes an image projector and one or more lighting systems. According to this embodiment, the lighting system includes a body including a first side and a surface defining a bore extending upwardly into the body; and one or more light sources disposed within the bore for emitting light downwardly such that light emitted by the one or more light sources is not projected upwardly directly into the eyes of a person adjacent the light system in which the one or more lighting systems do not significantly increase the low level of ambient lighting.

The image projection system of the present invention preferably includes two or more different lighting systems.

Additional features and advantages of the present invention will be readily apparent to those of ordinary skill in the art upon a reading of the following detailed description of presently preferred, but nonetheless illustrative, embodiments of the present invention when taken in conjunction with the accompanying drawings.

BRIEF DESCRIPTION OF THE DRAWINGS

For a more complete understanding of the present invention, and the advantages thereof, reference is now made to the following descriptions taken in conjunction with the accompanying drawings.

DETAILED DESCRIPTION OF THE INVENTION

The lighting system of the present invention can be used in areas wherein low-level ambient lighting is required such as in a theater, auditorium, planetarium or museum. The lighting system incorporates at least one light source which is not readily directly visible to a user either standing or seated adjacent the lighting system. The lighting system is capable of illuminating objects held near its light source while at the same time not directly projecting light into the eyes of a user and not significantly increasing the level of light in a low-level ambient lighted area.

Figure 1:
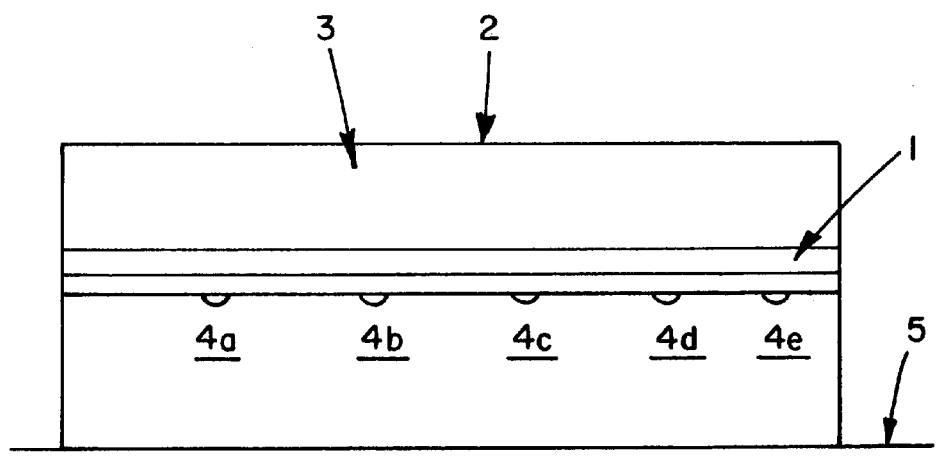
FIG. 1 is a rear elevation of a seating structure incorporating a lighting system according to the invention.

FIG. 1 depicts one of several preferred embodiments of the lighting system according to the invention. A seating structure 2 is resting upon a surface, support structure or ground 5. The seating structure 2 has a back 3 having affixed thereto a lighting system 1 which comprises at least one light source and preferably plural light sources 4a–4e.

Figures 2A, 2B:
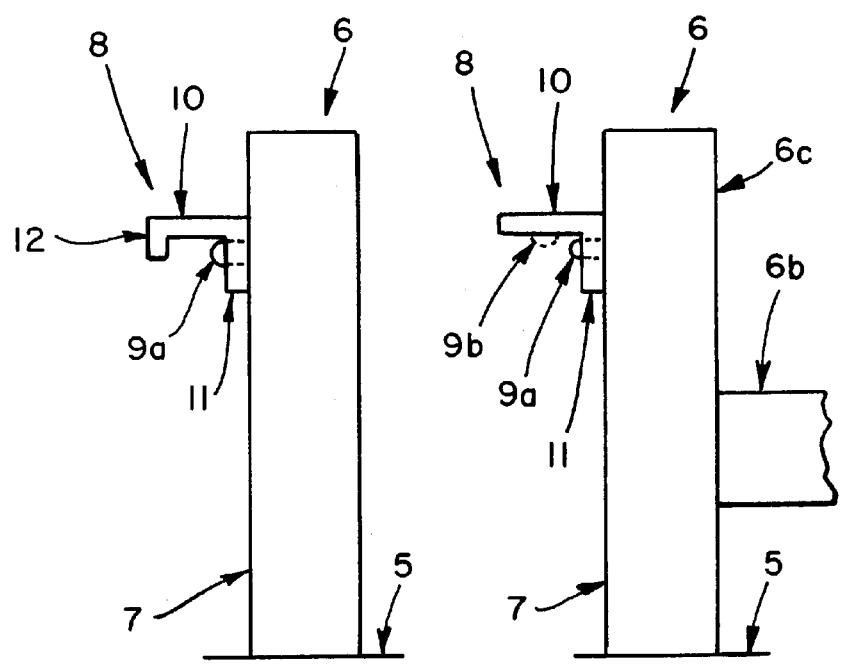
FIG. 2a is a side elevation of a second embodiment of the lighting system according to the invention.
FIG. 2b is a side elevation of a third embodiment of a lighting system according to the invention.

FIG. 2a depicts a second embodiment of the lighting system according to the invention. The seating structure 6, wherein the seating area is not shown, has a rear surface or back 7 onto which is attached or affixed the lighting system 8 which comprises a cover 10 and a support structure 11 by which the lighting system 8 is attached to the back 7. The lighting system 8 can also be integral with or can comprise a portion which is integral with the back 7. The lighting system 8 also comprises a light source 9a which is depicted as being associated with the support 11. The cover 10 blocks light emitted upwardly from the light source 9a but permits light emitted downwardly toward the ground 5 to escape the lighting system. The cover 10 can further include a lip 12 which projects downwardly toward the ground thereby occluding even further the light source 9a and reducing even further the amount of light emitted from the lighting system. The back 7 extends along a plane substantially vertical to the ground 5. In preferred embodiments, the back 7 is inclined with respect to a plane vertical to the ground 5. The support 11 is affixed to the back 7 by any of a number of attachment means known to those of ordinary skill in the art such as an adhesive, glue, screw, nail, joint, weld, fitting, connection, coupling and the like. The cover 10 extends substantially perpendicular to the back 7 and is affixed to either the support 11 or the back 7. The cover 10, support 11 and optionally the lip 12 can form an integral structure which is affixed to the back 7. By using molded plastic and materials of the like, the lighting system 8 can also be integral with the back 7.

FIG. 2b depicts a third embodiment of the lighting system according to the invention. The seating structure 6 has a seating area 6b disposed on a front surface 6c and a lighting system according to the invention 8 disposed on a rear surface 7 of the seating structure 6. The lighting system 8 is attached to the rear surface 7 by way of the support 11. The cover 10 is affixed to the support 11. In one embodiment, the light source 9a is disposed adjacent or within the support structure 11 and in a second embodiment the light source 9b indicated by dashed lines is disposed within or affixed to the cover 10. In the embodiment of FIG. 2, the cover 10 extends outwardly from the back 7 a sufficient length to block or occlude light rays which are emitted upwardly from the light source 9a thereby minimizing the direct projection of light into the eyes of a user adjacent the lighting system 8.

According to the embodiments of the present invention depicted in FIGS. 2a and 2b, a reinforcing member may be disposed between the cover 10 and the support 11 so as to maintain the proper orientation of the cover 10 with respect to the support 11 and to resist upward or downward force on the cover 10 that would tend to break or deform the cover 10.

Figure 3:
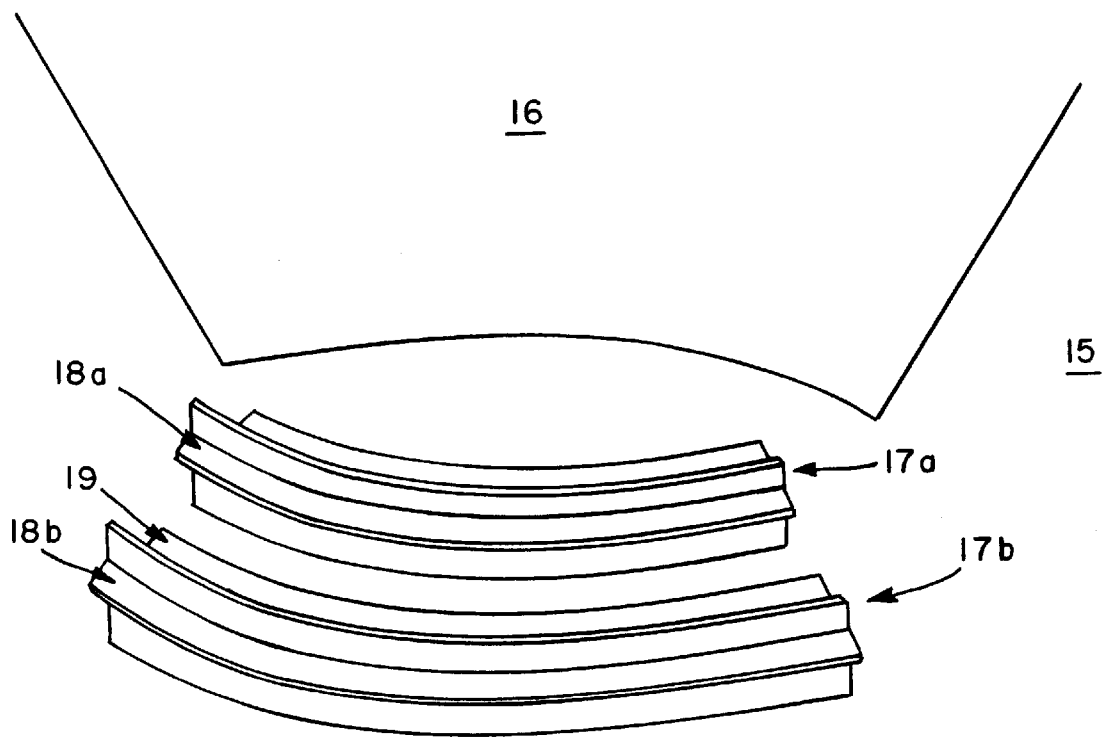
FIG. 3 is a perspective view of a portion of a planetarium employing the lighting system according to the invention.

FIG. 3 depicts a perspective view of a portion of a planetarium employing the lighting system according to the invention. Preferably, the planetarium employing the lighting system according to the invention includes a circular theater. The planetarium has low level ambient lighting and images of stars and other celestial objects are projected onto the wall, roof or screen 16. Audiences viewing a show in the planetarium are seated on the benches 17a and 17b. The bench 17b comprises a bench-type seating area 19 and an elongated lighting system according to the invention 18b which is disposed on the back of the seating structure 19. A person seated in the bench 19 is able to hold an object adjacent the lighting system 18a and specifically below the cover of the lighting system 18a and will be able to see or read a hand-held object while advantageously not significantly increasing the level of ambient lighting in the planetarium 15. The eyes of a user will also generally be able to remain dark adapted since the lighting system according to the invention emits light rays that minimize interference with dark adapted or night vision.

Figure 4:
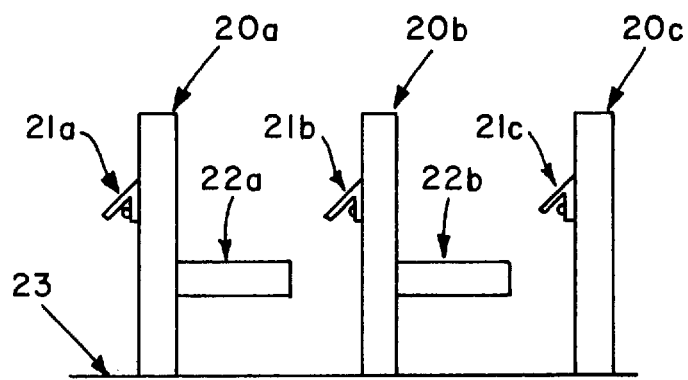
FIG. 4 is a side elevation of a fourth embodiment of the lighting system according to the invention.

FIG. 4 depicts a side elevation view of a fourth embodiment according to the invention wherein the seating structures 20a and 20b and 20c comprise seating areas 22a and 22b, respectively, and the light systems 21a and 21b, and 21c respectively. The seating structures 20a 20b and 20c are mounted onto a lower support structure, surface or ground 23. The seating structures 20a and 20b and 20c are bench-type structures wherein users are seated on the seating areas 22a and 22b, respectively. A person seated in the seating area 22a will be able to hold an object adjacent the lighting system 21b and will be able to view the object with light emitted downwardly toward the ground 23 from a light source of the lighting system 21b. A cover on the lighting system of 21b blocks light emitted upwardly from a light source of the lighting system such that light is not emitted directly into the eyes of a person seated adjacent the lighting system 21b. Those of ordinary skill in the art will recognize that the lighting system according to the invention can be disposed in a handrail or other device disposed on the seating structure and can also comprise a handrail, barrier, panel, railing, wall, parapet or banister disposed in front of the frontmost seating structure and the lighting system can be mounted on said barrier, panel, handrail, railing, wall, parapet or banister.

Figure 5:
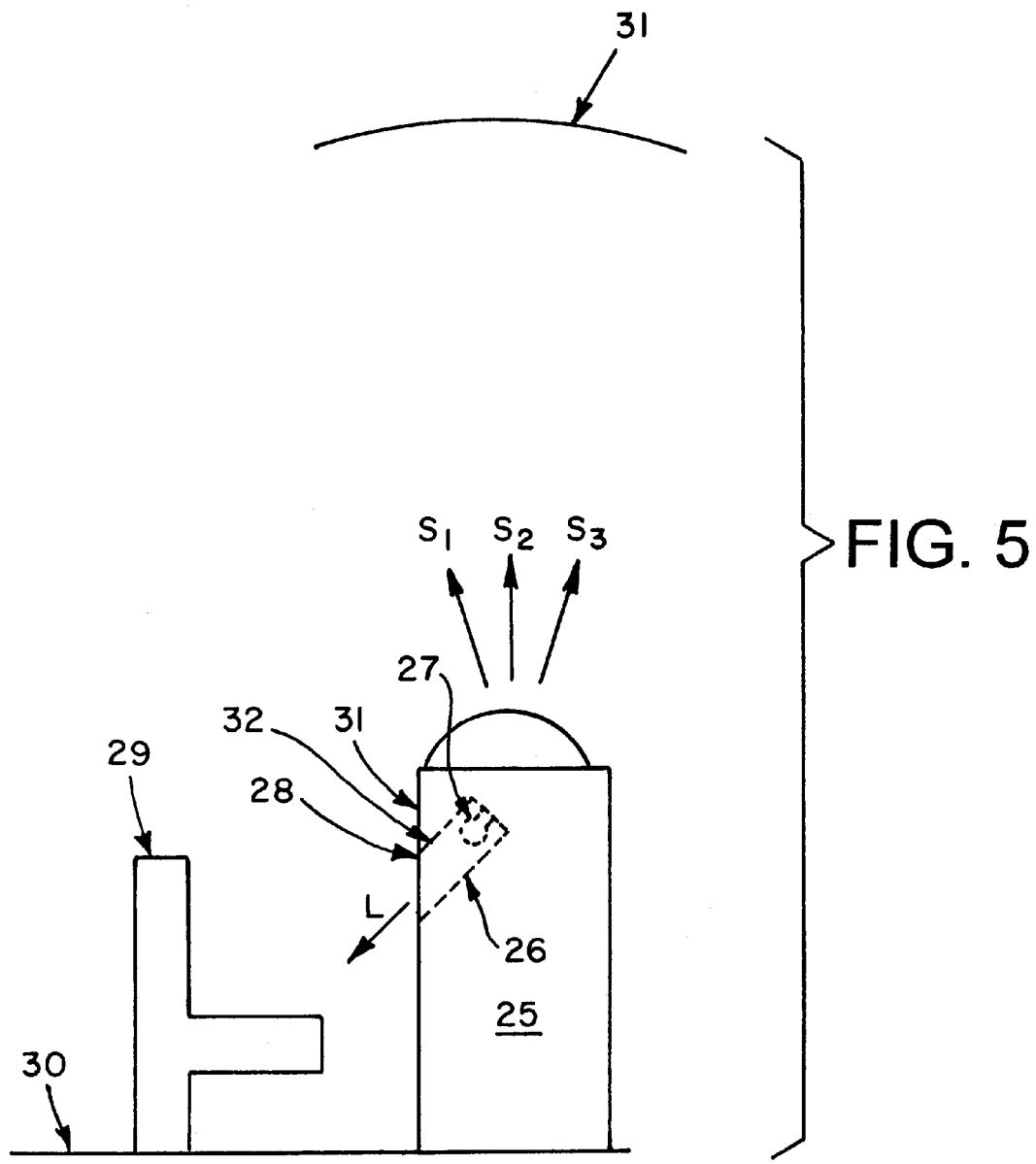
FIG. 5 is a side elevation of a fifth embodiment of the lighting system according to the invention.

FIG. 5 depicts a fifth embodiment of the invention wherein the lighting system is comprised within a projection system 25 which projects images of celestial objects in the direction of arrows S1, S2 and S3 onto the ceiling 31 of a planetarium. Adjacent the projection system is a seating structure 29 toward which is projected light emitted, from the light source 27, in the direction indicated by the arrow L. The projection system comprises a body having one or more lighting systems according to the invention. The lighting system comprises a body having a tube 26 shown in dashed lines. An upper surface 32 of the tube 26 intersects with the outer surface 31 of the projection system 25 at the juncture 28. The juncture 28 is disposed vertically below the light source 27 so that light emitted from the light source 27 does not project directly into the eyes of a person seated on the structure 29.

Figure 6:
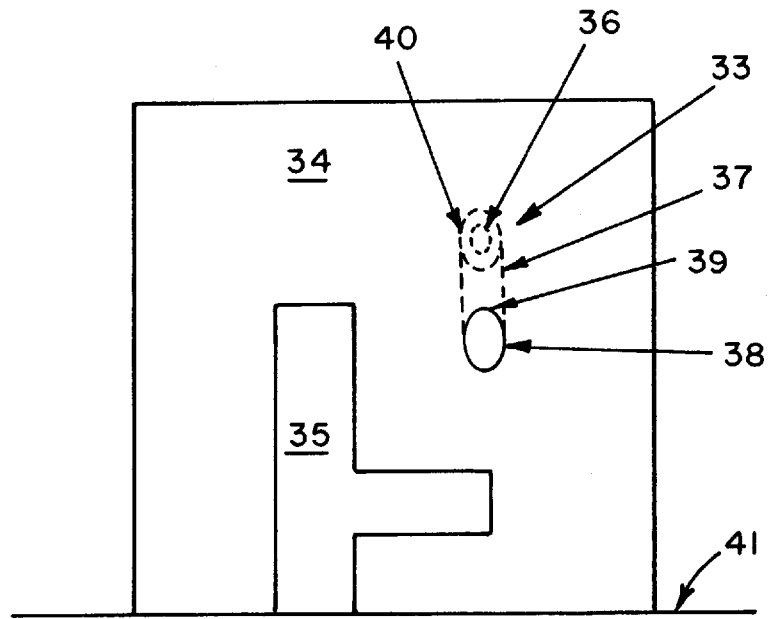
FIG. 6 is a side elevation of a sixth embodiment of the lighting system according to the invention.

FIG. 6 depicts a sixth embodiment of the invention wherein the lighting system is comprised within a wall 34 adjacent a seating structure 35. The lighting system 33 comprises a light source 36 mounted on a rear portion 40 of a tube or bore 37 within the wall structure 34. The light emitted from the light source 36 is projected through the opening 38 on the wall 34 and onto the seating structure 35 which is mounted on the support structure, surface or ground 41. An upper portion of the hole 38 and the bore 37 intersect at a juncture 39 which is disposed vertically below the light source 36 such that light emitted by the light source 36 does not project directly into the eyes of a user seated on the seating structure 35 while the user is holding and viewing an object not shown with the lighting system 33.

Figure 7:
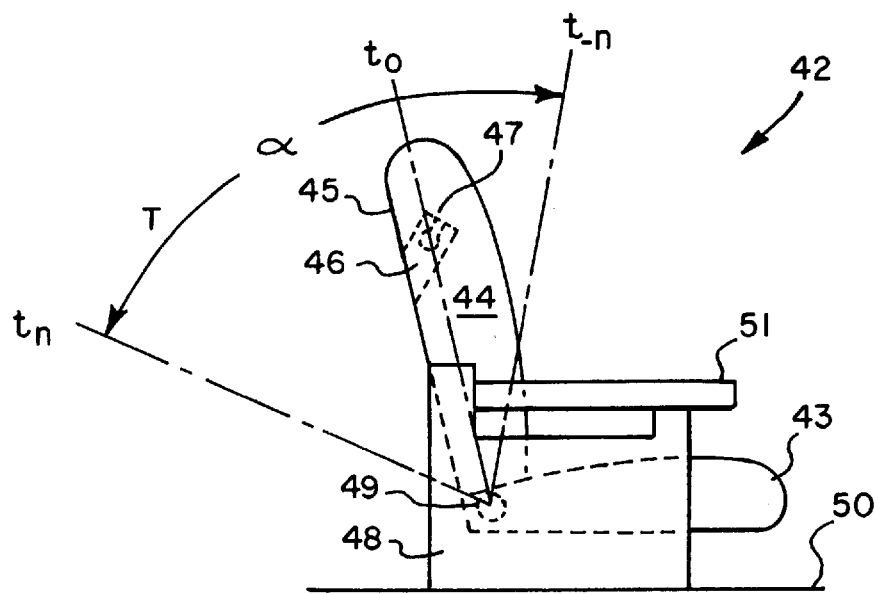
FIG. 7 is a side elevation of a seventh embodiment of the lighting system according to the invention.

FIG. 7 depicts a seventh embodiment of the lighting system according to the invention. As shown in FIG. 7, the seating structure 42 includes a base 48 upon which is mounted a seating area 43, a back 44 and an arm rest 51. The back 44 has a rear surface 45 and is pivotally mounted on the rod 49. The back 44 may be pivoted about rod 49 so as to be inclined at an angle a with respect to the support structure, surface or ground 50. The back 44 is shown as being disposed at an angle $t_o$ with respect to the ground 50 and may be oriented at various positions corresponding to various angles ranging from $t_n$ to $t_{-n}$. According to a preferred embodiment of the present invention, the back 44 may be disposed at an angle ranging from 30 to 120 degrees with respect to the ground 50. According to a most preferred embodiment of the present invention, the back 44 may be disposed at an angle ranging from 60 to 90 degrees with respect to the ground.

As shown in FIG. 7, the lighting system of the present invention may be disposed in a cavity 46 indicated by dashed lines in the back 44 so that little to no part of the lighting system protrudes from the back 44. According to this embodiment of the present invention, the light source 47 is located within the cavity 46 so as to minimize the direct projection of light into the eyes of a user adjacent the light source 47. Although not shown in FIG. 7, those of ordinary skill in the art will recognize that the light source 47 could be disposed in other parts of the seating structure 42 such as the armrest 51 so long as the direct projection of light into the eyes of a user adjacent the light source 47 is minimized.

According to all embodiments of the present invention, the lighting system is preferably a very low-voltage system on the order of 4 Volts. Preferably, the lighting system is constructed so that the flow of electricity can be controlled to individual seats or groups of seats. Preferably, multiple LED bulbs or a superbright LED bulb may be utilized as a light source when the light source is located a long distance from a seat or a group of seats. Also preferably, when the lighting system of the invention projects light onto a remote object, the lighting system can comprise optical elements such as lenses, mirrors, films and the like to facilitate projection, focusing, and/or targeting of the light onto the distant object.

The above is a detailed description of particular embodiments of the invention. Those with skill in the art should, in light of the present disclosure, appreciate that obvious modifications of the embodiments disclosed herein can be made without departing from the spirit and scope of the invention. All of the embodiments disclosed and claimed herein can be made and executed without undue experimentation in light of the present disclosure. The full scope of the invention is set out in the claims that follow and their equivalents. Accordingly, the claims and specification should not be construed to unduly narrow the full scope of protection to which the present invention is entitled.

What is claimed is:

1. A lighting system for use in a theater, auditoriurm, museum or planetarium having a low level of ambient light, the lighting system comprising:

a seating structure having a back;

at least one light source disposed adjacent said back of said seating structure; and a light blocking member disposed adjacent said at least one light source, said light blocking member being stationary with respect to said light source and said back such that at least a portion of light emitted by said at least one light source constantly illuminates an area adjacent said lighting system, and said light blocking member preventing projection of said light directly into the eyes of a person adjacent said lighting system;

wherein said lighting system does not significantly increase the level of ambient light in a theater, auditorium, museum or planetarium.

2. The lighting system of claim 1 wherein said back is disposed along a plane which is between 30 and 120 degrees relative to a supporting surface disposed beneath said seating structure.

3. The lighting system of claim 2 wherein said back is disposed along a plane which is between 60 and 90 degrees relative to said supporting surface disposed beneath said seating structure.

4. The lighting system of claim 3 wherein said back is disposed along a plane which is substantially vertical relative to said supporting surface disposed beneath said seating structure.

5. The lighting system of claim 1 wherein said light source is integral with said back.

6. The lighting system of claim 1 wherein said light blocking member comrprises a cavity in said back and wherein said light source is disposed within said cavity.

7. The lighting system of claim 1 wherein said light blocking member comprises:

a cover extending from said back of said seating structure for blocking a major portion of light emitted from said light source to thereby prevent projection of said light directly into the eyes of a person adjacent said lighting system.

8. The lighting system of claim 7 wherein said light source is affixed to at least one of said back of said seating structure or said cover.

9. The lighting system of claim 7 wherein said cover has an edge which is distal to said back of said seating structure and extends in a downward direction toward said supporting surface.

10. The lighting system of claim 1 wherein said light source emits light having a wavelength corresponding to at least one of red light or green light.

* * * * *

UNITED STATES PATENT AND TRADEMARK OFFICE
CERTIFICATE OF CORRECTION

PATENT NO.    : 6,199,999 B1
DATED         : March 13, 2001
INVENTOR(S)   : John L. Cotton, Jr.

It is certified that error appears in the above-identified patent and that said Letters Patent is hereby corrected as shown below:

Column 2,
Line 24, change "low-evel" to -- low-level --.

Column 5,
Line 19, change "angle a" to -- angle $\alpha$ --.

Signed and Sealed this

Third Day of December, 2002

JAMES E. ROGAN
*Director of the United States Patent and Trademark Office*